(12) United States Patent
Hosoda et al.

(10) Patent No.: US 9,975,593 B2
(45) Date of Patent: May 22, 2018

(54) BLINKER DEVICE

(71) Applicant: HONDA MOTOR CO., LTD., Tokyo (JP)

(72) Inventors: Yuta Hosoda, Wako (JP); Kazuhiko Mori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 60 days.

(21) Appl. No.: 15/102,276

(22) PCT Filed: Dec. 3, 2014

(86) PCT No.: PCT/JP2014/082001
§ 371 (c)(1),
(2) Date: Jun. 7, 2016

(87) PCT Pub. No.: WO2015/098446
PCT Pub. Date: Jul. 2, 2015

(65) Prior Publication Data
US 2016/0318568 A1    Nov. 3, 2016

(30) Foreign Application Priority Data
Dec. 24, 2013   (JP) .................. 2013-265280

(51) Int. Cl.
*B60Q 1/34* (2006.01)
*B62J 6/00* (2006.01)
*B60Q 1/26* (2006.01)
*B60Q 1/38* (2006.01)
*B62J 6/18* (2006.01)

(52) U.S. Cl.
CPC ............ *B62J 6/005* (2013.01); *B60Q 1/2615* (2013.01); *B60Q 1/2657* (2013.01); *B60Q 1/38* (2013.01);
(Continued)

(58) Field of Classification Search
CPC . B60Q 1/0035; B60Q 1/34; B60Q 1/38; B62J 6/005; B62J 6/18; F21S 48/211; F21S 48/215; F21S 48/31; F21S 48/33
See application file for complete search history.

(56) References Cited

U.S. PATENT DOCUMENTS 8,147,103 B2 * 4/2012 Kageyama ........... B60Q 1/2657
362/473
8,568,004 B2 * 10/2013 Nishijima ............... B62J 6/005
362/473
(Continued)

FOREIGN PATENT DOCUMENTS

CN     101423080        5/2009
JP     62-152889 U      9/1987
(Continued)

OTHER PUBLICATIONS

International Preliminary Report on Patentability with Translation of Written Opinion of the International Searching Authority for corresponding International Application No. PCT/JP2014/082001, dated Jul. 7, 2016.
(Continued)

*Primary Examiner* — Peggy Neils
(74) *Attorney, Agent, or Firm* — Mori & Ward, LLP

(57) ABSTRACT

The elastic member (60) is enabled, by temporarily elastically deforming a part thereof, to be fitted with and removed from the fixing portion (24a), and is provided with a tabular fixing member (80) that prevents elastic deformation of the elastic member (60) by being fixed to the elastic member (60), and a fastening member (90) that integrally fixes the blinker housing (51), the elastic member (60), and the fixing member (80). In the fixing member (80), a fastening hole portion (86) through which the fastening member (90) is inserted and a wiring hole portion (83) through which a wiring (92) that supplies electricity to the light source (54)
(Continued)

is inserted are disposed side by side to each other, and in the wiring hole (83), a cut-away (83*a*) to open a part of the wiring hole (83) is provided.

7 Claims, 11 Drawing Sheets

(52) U.S. Cl.
CPC .................. *B62J 6/18* (2013.01); *F21S 43/14* (2018.01); *F21S 43/19* (2018.01); *F21S 45/10* (2018.01); *F21S 45/50* (2018.01)

(56) References Cited

U.S. PATENT DOCUMENTS

| | | | |
|---|---|---|---|
| 9,346,393 B2 * | 5/2016 | Shibuya | B60Q 1/0005 |
| 2012/0069590 A1 | 3/2012 | Nishijima et al. | |
| 2014/0016336 A1 | 1/2014 | Takenaka et al. | |

FOREIGN PATENT DOCUMENTS

| | | |
|---|---|---|
| JP | 02-002292 U | 1/1990 |
| JP | 2006-353062 | 12/2006 |
| JP | 3157693 U | 2/2010 |
| JP | 2011-171074 | 9/2011 |
| JP | 2012-062014 | 3/2012 |
| WO | WO 2012/132831 | 10/2012 |

OTHER PUBLICATIONS

Japanese Office Action for corresponding JP Application No. 2013-265280, dated Apr. 30, 2015.

Taiwanese Office Action for corresponding TW Application No. 103143312, dated Nov. 27, 2015.

International Search Report for corresponding International Application No. PCT/JP2014/082001, dated Mar. 10, 2015.

Written Opinion for corresponding International Application No. PCT/JP2014/082001, dated Mar. 10, 2015.

* cited by examiner

BLINKER DEVICE

TECHNICAL FIELD

The present invention relates to a blinker device, and particularly, to a blinker device that is stood from an exterior component such as a cowling of a motorcycle and extends to an outer side in a vehicle width direction.

BACKGROUND ART

Conventionally, as a blinker device that is stood from an exterior component such as a cowling of a motorcycle and extends to an outer side in a vehicle width direction, a blinker device configured so that to avoid concentration of stress in a mounting base portion of the blinker device when an external force is applied to the blinker device, the mounting base portion of the blinker device is made of an elastic member such as rubber, is known.

Patent Literature 1 discloses a blinker device in which a tubular elastic member that serves a mounting base portion of the blinker device is attached to an inner side in the vehicle width direction of a housing made of a hard resin or the like. This blinker device is configured such that, after the elastic member is temporarily elastically deformed and fitted to an opening formed in the exterior component, a metal-made retainer is inserted from the inner side in the vehicle width direction to prevent the elastic member from coming out of the opening.

CITATION LIST

Patent Literatures

Patent Literature 1: JP 2012-062014 A

SUMMARY OF INVENTION

Technical Problem

However, in the configuration described in Patent Literature 1, a screw that fixes the retainer and the elastic member is screwed from the outer side in the radial direction of the elastic member at a position on the outer side of the exterior component, so that the screw head and the boss portion surrounding the screw are exposed to the outside and influence the appearance of the blinker device.

This problem can be solved by orienting the screw that fixes the retainer and the elastic member in the retainer insertion direction and screwing the screw from the inside of the exterior component. However, in this method, an insertion hole for the fixing screw needs to be provided in addition to an insertion hole for wiring to supply electricity to the light source, and the mounting base portion of the blinker device tends to increase in size.

An object of the present invention is to solve the above-described problem of the conventional technique, and provide a blinker device that can prevent a fixing screw from being exposed outward, while avoiding an increase in size of a mounting base portion.

Solution to Problems

To achieve the afore-mentioned object, the present invention has a first feature in that a blinker device (50) in which a blinker housing (51) internally equipped with a light source (54) is elastically supported on a fixing portion (24a) on the side of a vehicle body via an elastic member (60), wherein the elastic member (60) is configured to be capable of being fitted to and removed from the fixing portion (24a) by elastically deforming a part of the elastic member (60), the blinker device (50) comprises: a fixing member (80) that is fixed to the elastic member (60); and a fastening member (90) that fixes the blinker housing (51), the elastic member (60), and the fixing member (80) integrally, in the fixing member (80), a fastening hole portion (86) through which the fastening member (90) is inserted, and a wiring hole portion (83) through which a wiring (92) to supply electricity to the light source (54) is inserted, are disposed side by side to each other, and the wiring hole portion (83) is provided with a cut-away (83a) that opens a part of the wiring hole portion (83).

The present invention has a second feature in that the fixing member (80) is provided with a halved cylindrical portion (84) that is stood from a rim of the wiring hole portion (83) and passes through a through hole (64) for wiring provided in the elastic member (60).

The present invention has a third feature in that the fixing member (80) is provided with a tubular collar member (85) that passes through a through hole (65) for a fastening member provided in the elastic member (60) so as to be stood from a rim of the fastening hole portion (86) and parallel to the halved cylindrical portion (84).

The present invention has a fourth feature in that in the blinker housing (51), a cylindrical boss (57) in which the fastening member (90) is screwed is formed, and the cylindrical boss (57) is provided with a positioning projection (59) that engages in a positioning groove (68) formed in the elastic member (60).

The present invention has a fifth feature in that the fixing member (80) is provided with a wiring guide portion (82) to guide the wiring (92) that projects to the inside of a vehicle body after the blinker device (50) is assembled.

The present invention has a sixth feature in further the fixing member (80) is provided with a tubular collar member (85) that passes through a through hole (65) for a fastening member provided in the elastic member (60), and the collar member (85) is configured to be brought into contact with the boss (57) provided in the blinker housing (51) by fastening the fastening member (90).

The present invention has a seventh feature in that the through hole (64) for wiring and the through hole (65) for a fastening member are made different in size from each other.

The present invention has an eighth feature in that the through hole (64) for wiring and the through hole (65) for a fastening member are provided side by side in the vehicle body front-rear direction.

Advantageous Effects of Invention

According to the first feature, a blinker device comprises: a fixing member that is fixed to an elastic member; and a fastening member that fixes a blinker housing, the elastic member, and the fixing member integrally, in the fixing member, a fastening hole portion through which the fastening member is inserted, and a wiring hole portion through which a wiring to supply electricity to a light source is inserted, are disposed side by side to each other, and the wiring hole portion is provided with a cut-away that opens a part of the wiring hole portion, wherein the elastic member is configured to be capable of being fitted to and removed from the fixing portion by elastically deforming a part of the elastic member. Therefore, even when a connector or the like is attached to an end portion of wiring, by inserting only the wiring portion through the cut-away, assembling is enabled, and the wiring hole portion does not need to be increased in size more than necessary to allow insertion of a connector, etc. Accordingly, even when the structure has two holes consisting of a fastening hole portion and a wiring hole portion to enable insertion of a fastening member to support a blinker housing on a vehicle body side from the inside of the vehicle body, the wiring hole portion can be formed to be small, therefore, an increase in size of the mounting base portion of the blinker device can be avoided.

According to the second feature, a fixing member is provided with a halved cylindrical portion that is stood from a rim of a wiring hole portion and passes through a through hole for wiring provided in an elastic member. Therefore, the wiring can be smoothly guided while the fixing member is positioned with respect to the elastic member.

According to the third feature, a fixing member is provided with a tubular collar member that passes through a through hole for a fastening member provided in an elastic member so as to be stood from a rim of a fastening hole portion and parallel to a halved cylindrical portion. Therefore, the fixing member can be more easily positioned with respect to the elastic member.

According to the fourth feature, in a blinker housing, a cylindrical boss in which a fastening member is screwed is formed, and the cylindrical boss is provided with a positioning projection that engages in a positioning groove formed in an elastic member. Therefore, erroneous fitting between the blinker housing and the elastic member can be prevented by a simple configuration. Accordingly, for example, erroneous fitting that causes a drainage hole provided in the elastic member to turn upward is prevented.

According to the fifth feature, a fixing member is provided with a wiring guide portion to guide a wiring that projects to the inside of a vehicle body after a blinker device is assembled. Therefore, without providing a separate component for guiding wiring, the wiring projecting to the inside of the vehicle body can be guided in a predetermined direction. Accordingly, the wiring is prevented from interfering with other components, and even when the wiring is pulled from the side of the vehicle body, by receiving the force of pulling the wiring by the wiring guide portion, the connection base portion of the wiring can be protected.

According to the sixth feature, a fixing member is provided with a tubular collar member that passes through a through hole for a fastening member provided in an elastic member, and the collar member is configured to be brought into contact with a boss provided in a blinker housing by fastening a fastening member. Therefore, the distance between the fixing member and the blinker housing is defined by the collar member, and reliable fastening is enabled.

According to the seventh feature, a through hole for wiring and a through hole for a fastening member are made different in size from each other. Therefore, erroneous fitting when the fastening member and the fixing member are fitted to each other can be prevented.

According to the eighth feature, a through hole for wiring and a through hole for a fastening member are provided side by side in the vehicle body front-rear direction. Therefore, the vertical dimension of the elastic member can be reduced, and the blinker mounting portion can be made to look slim as viewed from the vehicle body front-rear direction. Accordingly, the appearance of the blinker device can be improved, and a reduction in air resistance during traveling can also be realized.

DESCRIPTION OF EMBODIMENTS

Figure 1:
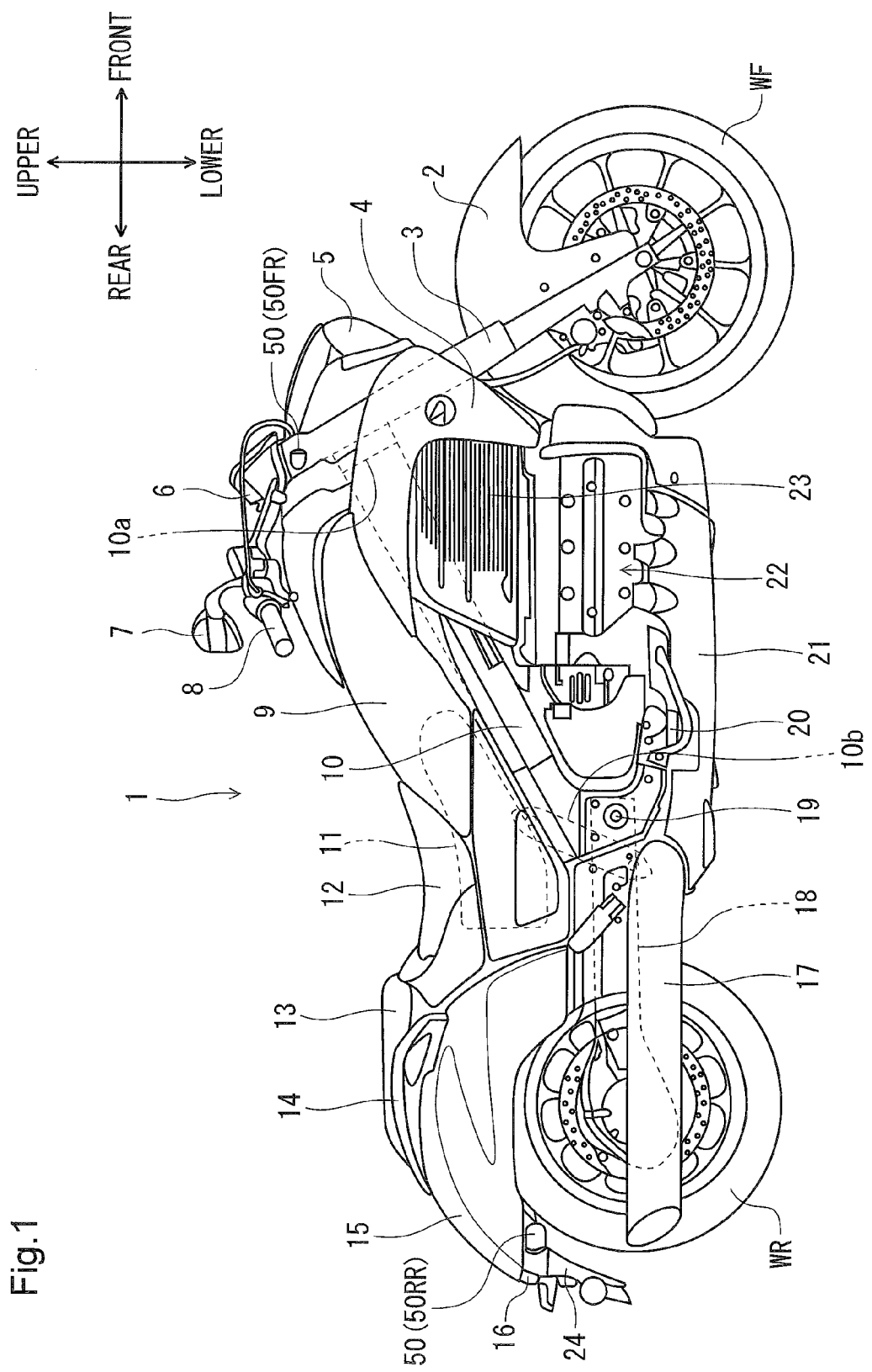
FIG. 1 is a right side view of a motorcycle to which a blinker device according to an embodiment of the present invention is applied.
Figure 2:
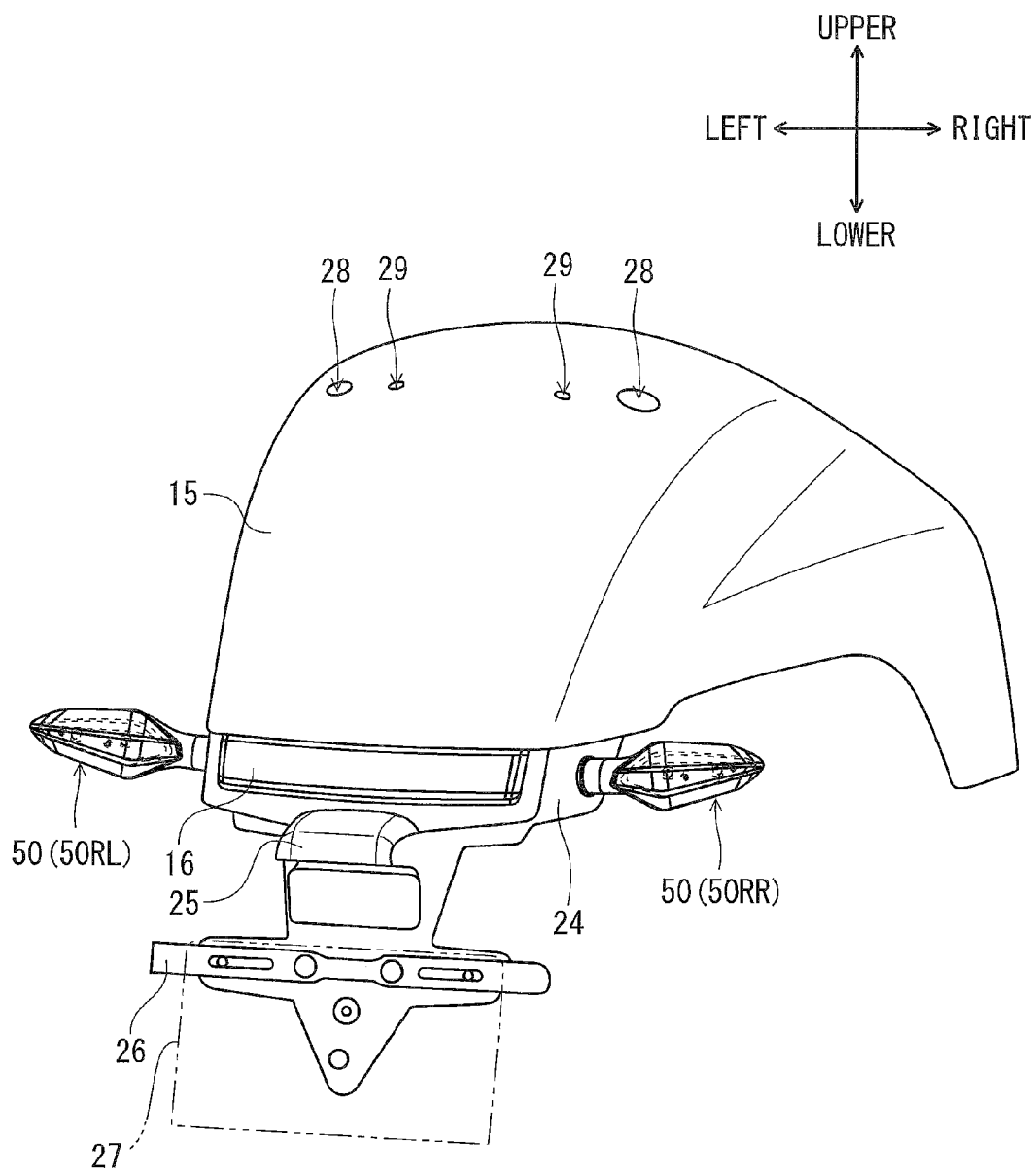
FIG. 2 is a partially enlarged view of the motorcycle viewed from the rear side.

Hereinafter, a preferred embodiment of the present invention is described in detail by referring to the drawings. FIG. 1 is a right side view of a motorcycle 1 to which a blinker device 50 according to an embodiment of the present invention is applied. FIG. 2 is a partially enlarged view of the motorcycle 1 viewed from the rear side.

At a front end portion of a vehicle body frame 10, a head pipe 10a is provided. To the head pipe 10a, a pair of left and right front forks 3 that axially support a front wheel WF rotatably are attached in a steerable manner. To the front forks 3, a front fender 2 that covers the front wheel WF, a headlight 5, and a pair of left and right front blinker devices 50 (only right blinker device 50FR is shown) are attached. To an upper portion of the front forks 3, a meter device 6, a pair of left and right steering handles 8, and a rearview mirror 7 are attached.

On a pivot 19 of the vehicle body frame 10, a swing arm 18 that axially supports a rear wheel WR as a drive wheel rotatably is axially supported swingably. The swing arm 18 is hung down from the vehicle body frame 10 by a rear cushion 10b.

To a position on the vehicle body front side of the pivot 19 of the vehicle body frame 10, an engine 22 is attached. At positions on the outer sides in the vehicle width direction of the vehicle body frame 10 above the engine 22, a pair of left and right radiators 23 and radiator covers 4 are disposed. Below the engine 22, an undercover 21 is provided, and an exhaust pipe covered by the undercover 21 is connected to a muffler 17 on the rear side of a footrest step 20.

Above the pivot 19 of the vehicle body frame 10, a fuel tank 11 is disposed, and a front upper side of the fuel tank 11 is covered by a fuel tank cover 9. To a rear portion of the fuel tank cover 9, a driver seat 12 is attached, and to an upper portion of a rear fender 15 covering the rear wheel WR, a fellow passenger seat 13 and a pair of left and right grab bars 14 are attached.

At a rear end lower portion of the rear fender 15, a rear fender 24 is provided, and to this rear fender 24, a taillight device 16 and rear blinker devices 50 according to the present invention (hereinafter, simply referred to as blinker devices 50. Only the right blinker device 50RR is shown.) are attached. The front and rear blinker devices 50 can be structured in common.

Referring to FIG. 2, in the rear fender 15 painted in a predetermined vehicle body color, pairs of left and right positioning holes 28 for fixing the fellow passenger seat 13 and left and right through holes 29 for a fastening member are provided. The rear fender 24 is a tabular integral component made of a black resin or the like, and in a rear surface portion whose front and back surfaces are oriented in the vehicle body front-rear direction, the taillight device 16 is embedded, and on side surface portions whose front and back surfaces are oriented in the vehicle width direction, the blinker devices 50 (50RL and 50RR) are mounted. On a lower portion of the taillight device 16, a license light 25 is provided, and below the license light 25, a fixing bracket 26 to fix a license plate 27 is attached.

Figure 3:
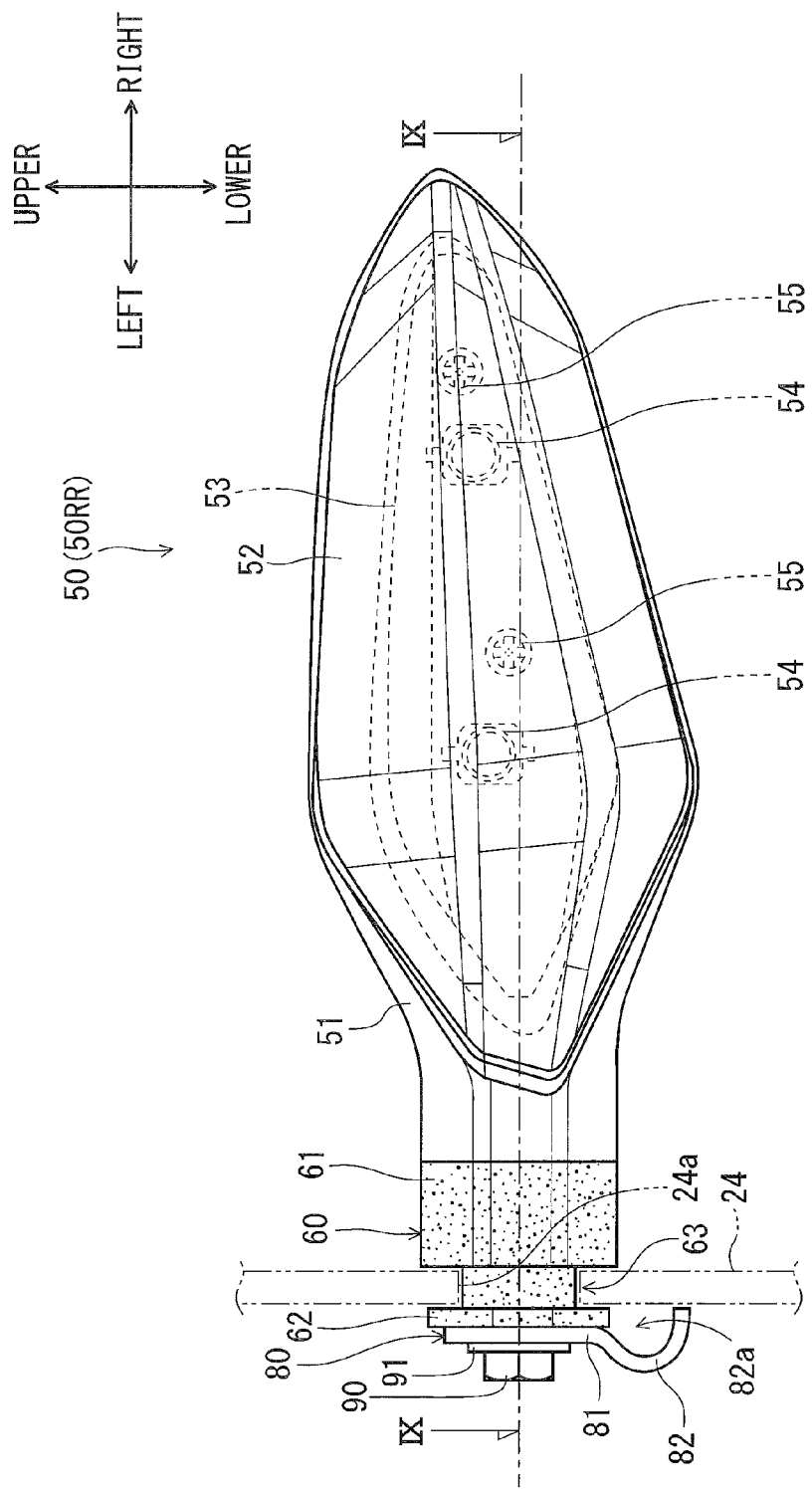
FIG. 3 is a front view of the blinker device.

FIG. 3 is a front view of the blinker device 50. Hereinafter, description is given by referring to the blinker device 50RR on the rear right side simply as the blinker device 50. The blinker device 50RL on the rear left side has a symmetrical shape. The blinker device 50 is configured such that a substrate 53 on which two light sources 54 consisting of LEDs are mounted side by side in the vehicle width direction is fixed to a blinker housing 51 by two screws 55, and an opening portion into which the substrate 53 is inserted is covered by a lens 52. The blinker housing 51 can be made of a black resin or the like. The lens 52 can be formed by a white translucent resin or the like after orange LEDs are applied as the light sources 54.

On the inner side in the vehicle width direction of the blinker housing 51, an elastic member 60 to elastically support the blinker device 50 on the side of a vehicle body is provided. The elastic member 60 made of rubber or the like is fitted to a fixing portion on the side of a vehicle body (hereinafter, may be simply referred to as a fixing portion) 24a consisting of an opening formed in the tabular rear fender 24. The elastic member 60 includes a main body portion 61 exposed to the outside of the vehicle body, a small-diameter portion 63 that is fitted to the fixing portion 24a, and a flange portion 62 having a cross-sectional area larger than that of the small-diameter portion 63. The opening of the fixing portion 24a is formed to have substantially the same shape as that of the small diameter portion 63.

To fit the elastic member 60 to the fixing portion 24a on the side of a vehicle body, the flange portion 62 being a part of the elastic member 60 is temporarily elastically deformed and inserted through the fixing portion (opening) 24a. Accordingly, the small-diameter portion 63 is housed inside the fixing portion 24a, and positioning of the elastic member 60 is completed.

Then, when the tabular fixing member 80 in contact with the flange portion 62 is fixed to a predetermined position by screwing a bolt 90 as a fastening member, the blinker housing 51, the elastic member 60, and the fixing member 80 are integrally fixed. In addition, the flange portion 62 is prevented from deforming by proximal disposition of the main body portion 81 of the fixing member 80, and accordingly, the elastic member 60 is prevented from coming out of the fixing portion 24a.

Between the fastening member 90 and the fixing member 80, a washer 91 is provided. On a lower portion of the fixing member 80, a wiring guide portion 82 for forming a passage 82a of wirings 92 (refer to FIG. 4) between the fixing portion 80 and the rear fender 24 is provided.

Figure 4:
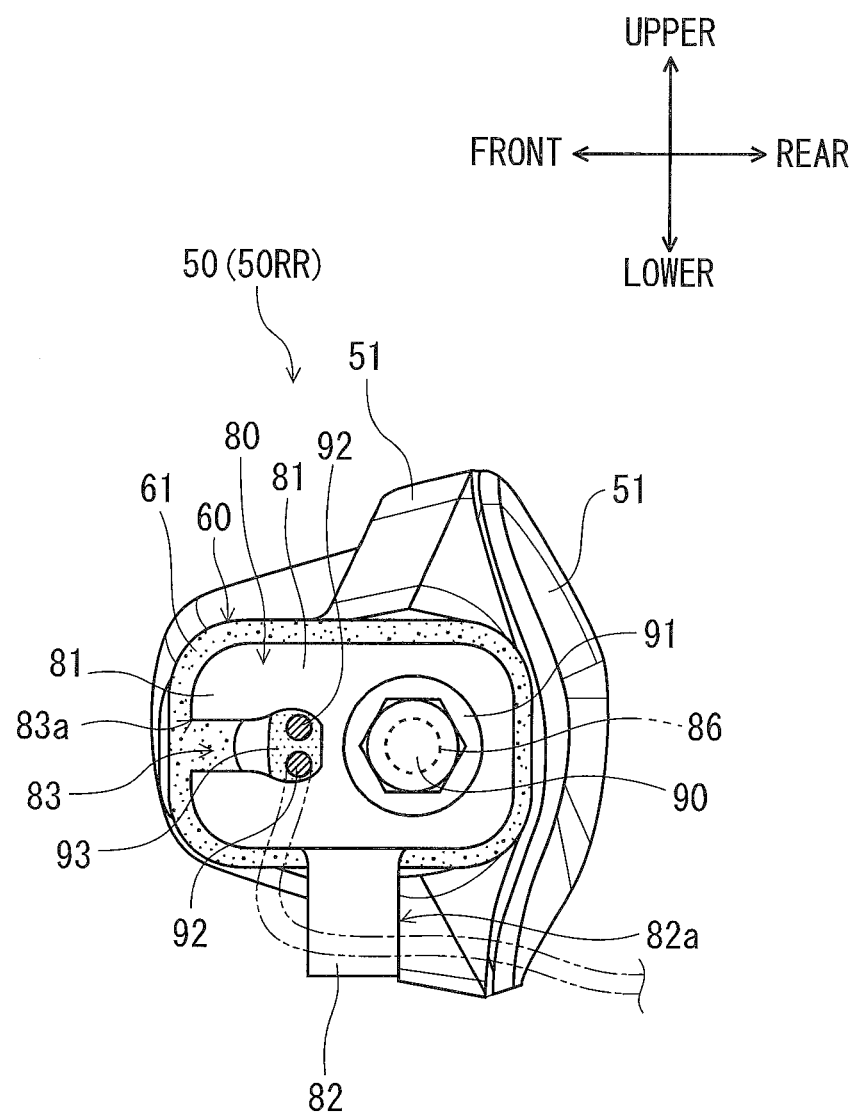
FIG. 4 is a left side view of the blinker device.

FIG. 4 is a left side view of the blinker device 50. The main body portion 81 of the fixing member 80 is formed to have a substantially rectangular shape horizontally long and slightly smaller than the flange portion 61 of the elastic member 60. In the main body portion 81 of the fixing member 80, a wiring hole portion 83 through which two wirings 92 are inserted, and a fastening hole portion 86 through which the fastening member 90 is inserted, are formed. Between these, the wiring hole portion 83 does not have a circular shape like the fastening hole portion 86, but has a shape a part of which is opened to the outside by being provided with a cut-away 83a. In this embodiment, the cut-away 83a is provided in a direction away from the fastening hole portion 86.

Figure 5:
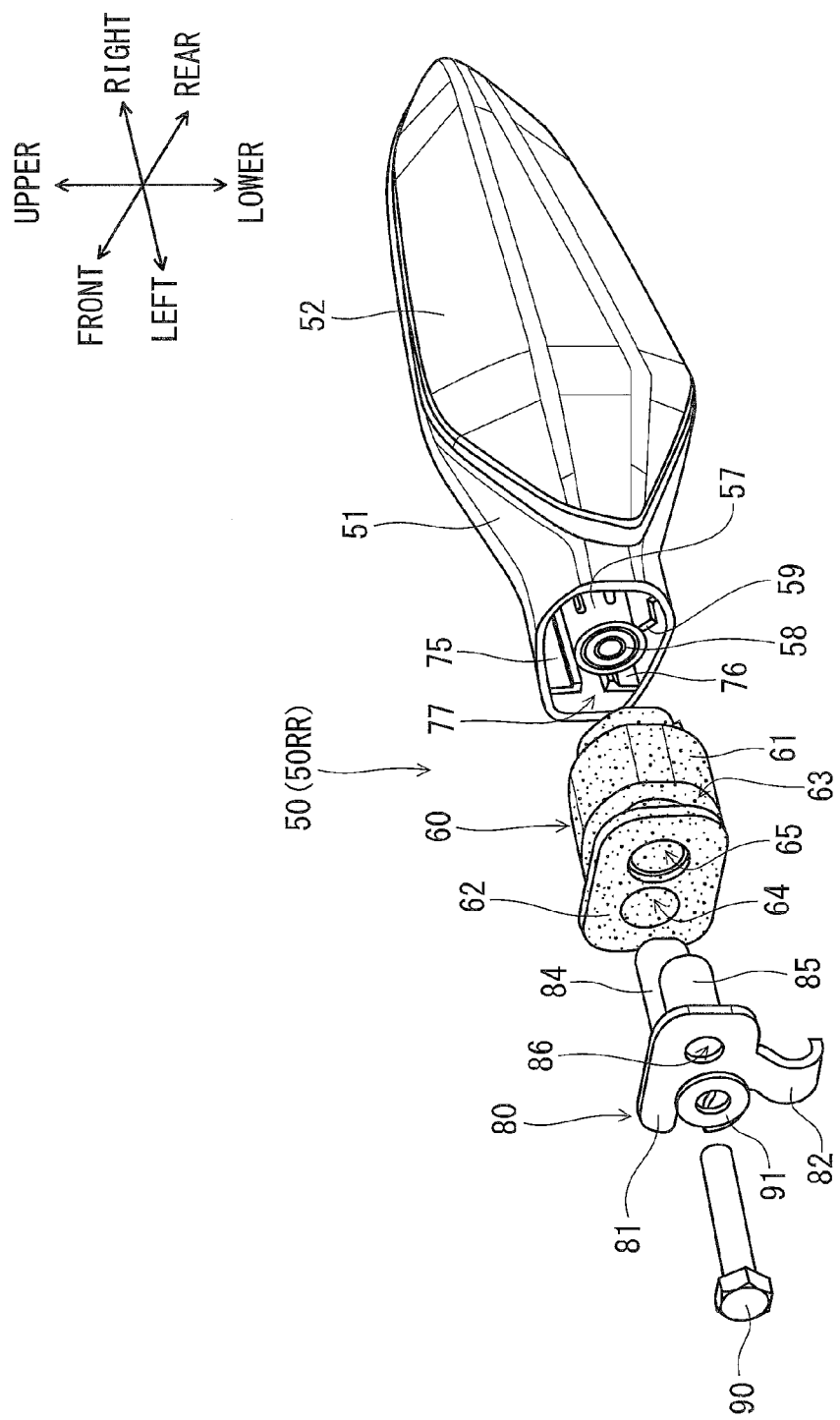
FIG. 5 is a perspective view showing a configuration of a mounting base portion of the blinker device as viewed from the vehicle body rear side.
Figure 6:
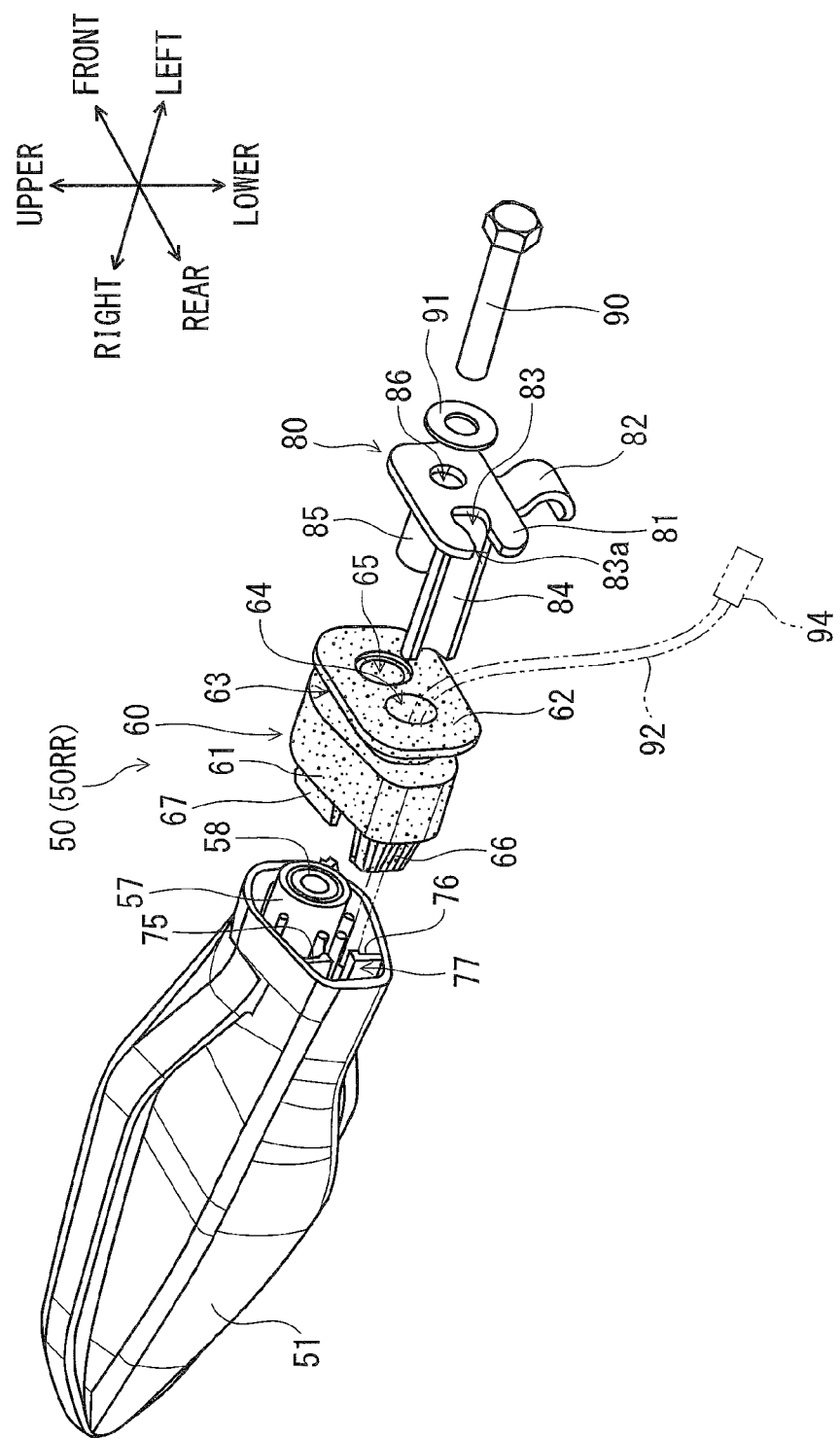
FIG. 6 is a perspective view showing a configuration of a mounting base portion of the blinker device as viewed from the vehicle body front side.
Figure 7:
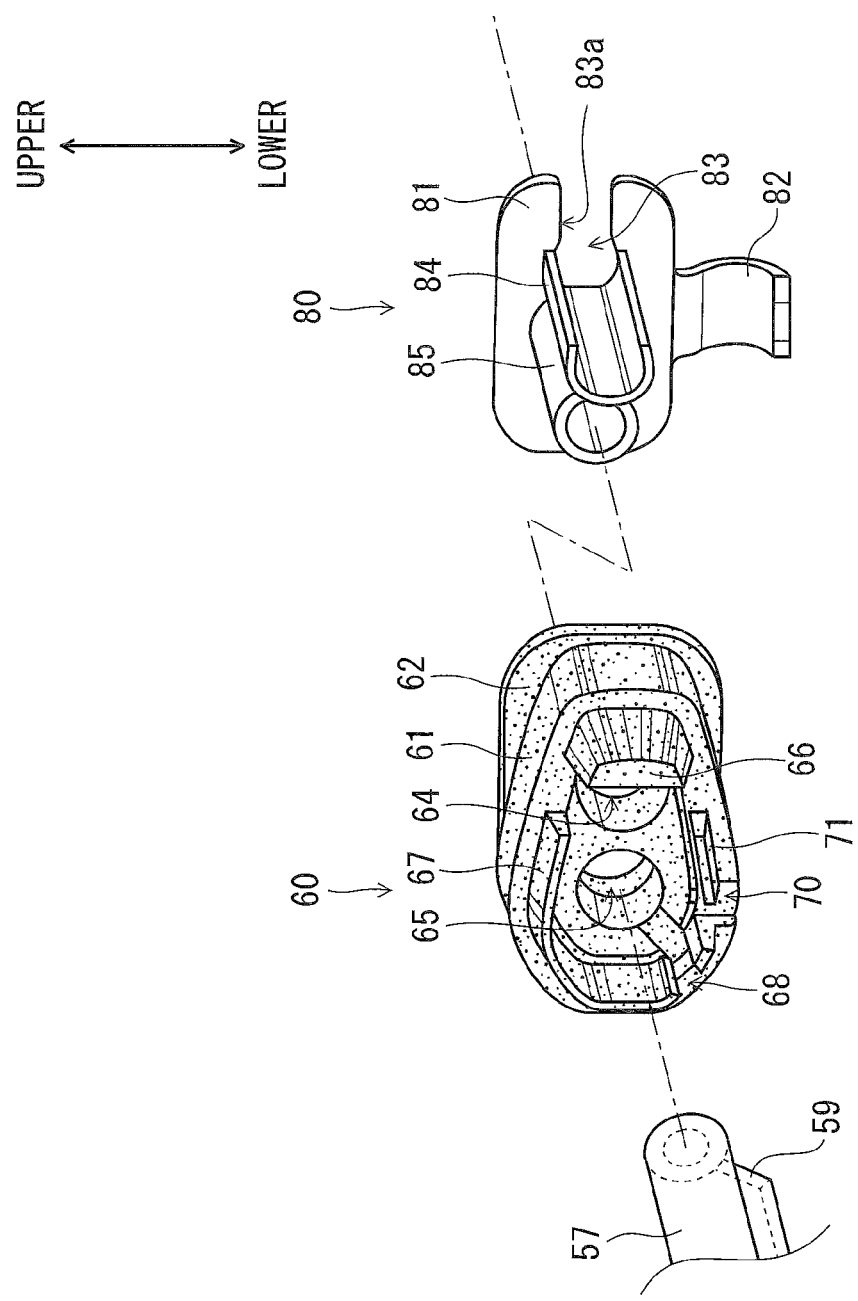
FIG. 7 is a perspective view of the elastic member and the fixing member viewed from the outer side in the vehicle width direction
Figure 8:
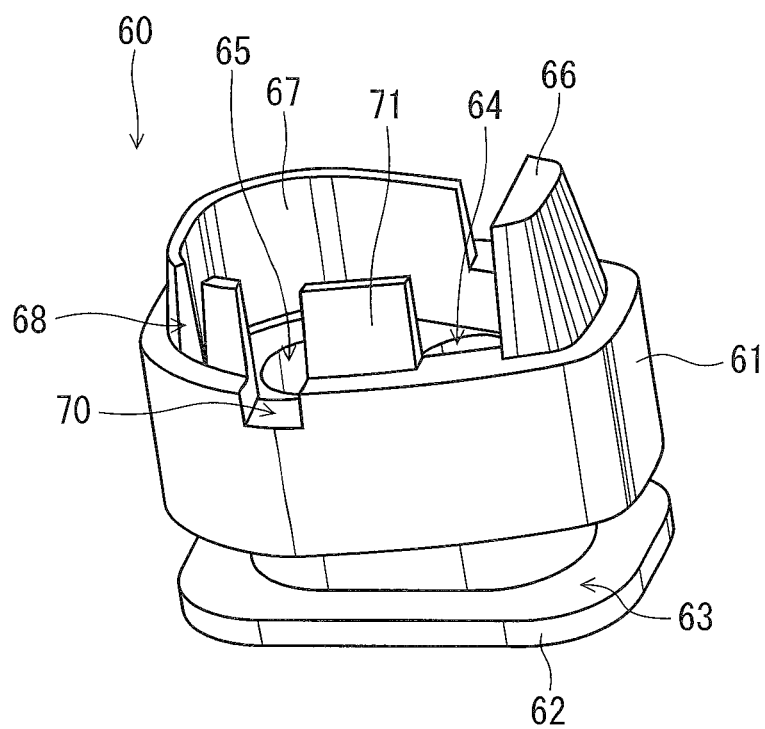
FIG. 8 is a perspective view of the elastic member.

FIG. 5 is a perspective view showing a configuration of a mounting base portion of the blinker device 50 as viewed from the vehicle body rear side. FIG. 6 is a perspective view of the same viewed from the vehicle body front side, FIG. 7 is a perspective view of the elastic member 60 and the fixing member 80 viewed from the outer side in the vehicle width direction, and FIG. 8 is a perspective view of the elastic member 60.

The blinker device 50 is mounted on the side of a vehicle body in such a manner that after the elastic member 60 is fitted to the fixing portion 24a on the side of the vehicle body, into the opening portion of the blinker housing 51, the elastic member 60 is inserted, and the fixing member 80 is inserted from the inside of the vehicle body, and then the fastening member 90 is screwed via the washer 91.

In the opening portion of the blinker housing 51, a cylindrical boss 57 in which an insert nut 58 is embedded is provided. On the side surface of the boss 57, a tabular positioning projection 59 that is stood on a radially outer side of the boss 57 is provided. On the vehicle body front side of the boss 57, an engagement hole 77 is formed by tabular ribs 75 and 76 that are provided substantially symmetrically in the vertical direction. On the other hand, on the elastic member 60 side, an engagement projection 66 that is engaged in the engagement hole 77 and a waterproof rib 67 disposed so as to surround an area from the upper side to the lateral lower side of the boss 57, are provided.

In the elastic member 60, a through hole 64 for wiring through which the wirings 92 are inserted, and a through hole 65 for a fastening member through which the fastening member 90 is inserted, are formed. On the other hand, as described above, in the main body portion 81 of the fixing member 80, the wiring hole portion 83 having the cut-away 83a and the circular fastening hole portion 86 are formed. The main body portion 81 of the fixing member 80 is provided with a halved cylindrical portion 84 that is stood from a rim of the wiring hole portion 83, and a tubular collar member 85 that is parallel to the halved cylindrical portion 84 and stood from a rim of the fastening hole portion 86.

When fitting the fixing member 80 to the elastic member 60, the halved cylindrical portion 84 is inserted in the through hole 64 for wiring and the collar member 85 is inserted in the through hole 65 for a fastening member. The halved cylindrical portion 84 and the collar member 85 both have a function to increase the rigidity of the blinker mounting base portion.

Here, assembling of the blinker device 50 according to the present embodiment is performed on the condition that the wirings 92 are inserted in the through hole 64 for wiring of the elastic member 60 in advance, before the fixing member 80 is inserted in the elastic member 60. This is because even when a component such as a connector 94 or the like is attached to the tip end of the wiring 92, the wiring can be easily inserted when the through hole for wiring is in a state where the cross-sectional area of thereof is large before the halved cylindrical portion 84 is inserted. In other words, the through hole 64 for wiring can be reduced in diameter to a size that is just enough for the connector 94 to pass through. Since the wiring hole portion 83 of the fixing member 80 is provided with the cut-away 83a, the wirings 92 can be housed in substantially the center of the wiring hole portion 83 in a state where the elastic member 60 and the fixing member 80 are engaged with each other.

With the above-described arrangement, even when both of the hole through which the fastening member 90 is inserted and the hole through which the wirings 92 are inserted are provided, the through hole 64 for wiring of the elastic member 60 and the wiring hole portion 83 of the fixing member 80 can be prevented from increasing in diameter, and the mounting base portion of the blinker device 50 can be downsized.

In the present embodiment, the hole through which the fastening member 90 is inserted and the hole through which the wirings 92 are inserted are disposed side by side to each other in the vehicle body front-rear direction, therefore, the dimension in the vertical direction of the mounting base portion of the blinker device 50 can be reduced, and the mounting base portion can be made to look slim in a front view or rear view of the blinker device 50, and the air resistance during traveling can be reduced.

Referring to FIG. 7 and FIG. 8, the positioning projection 59 provided on the boss 57 engages in a positioning groove 68 of the elastic member 60. This positioning groove 68 is formed by a slit of a waterproof rib 67 disposed so as to surround an area from the upper side to the lateral lower side of the boss 57. Between an end portion of a lowermost portion of the waterproof rib 67 and an end portion of a lower rib 71, a drainage hole 70 formed by cutting-away a part of the main body portion 61 is provided.

With the positioning structure using the positioning projection 59 of the boss 57, the positioning structure using the engagement projection 66, and the positioning structure using the waterproof rib 67 described above, the possibility of erroneous fitting that causes, for example, the drainage hole 70 to be positioned at the upper side, can be reduced.

Figure 9:
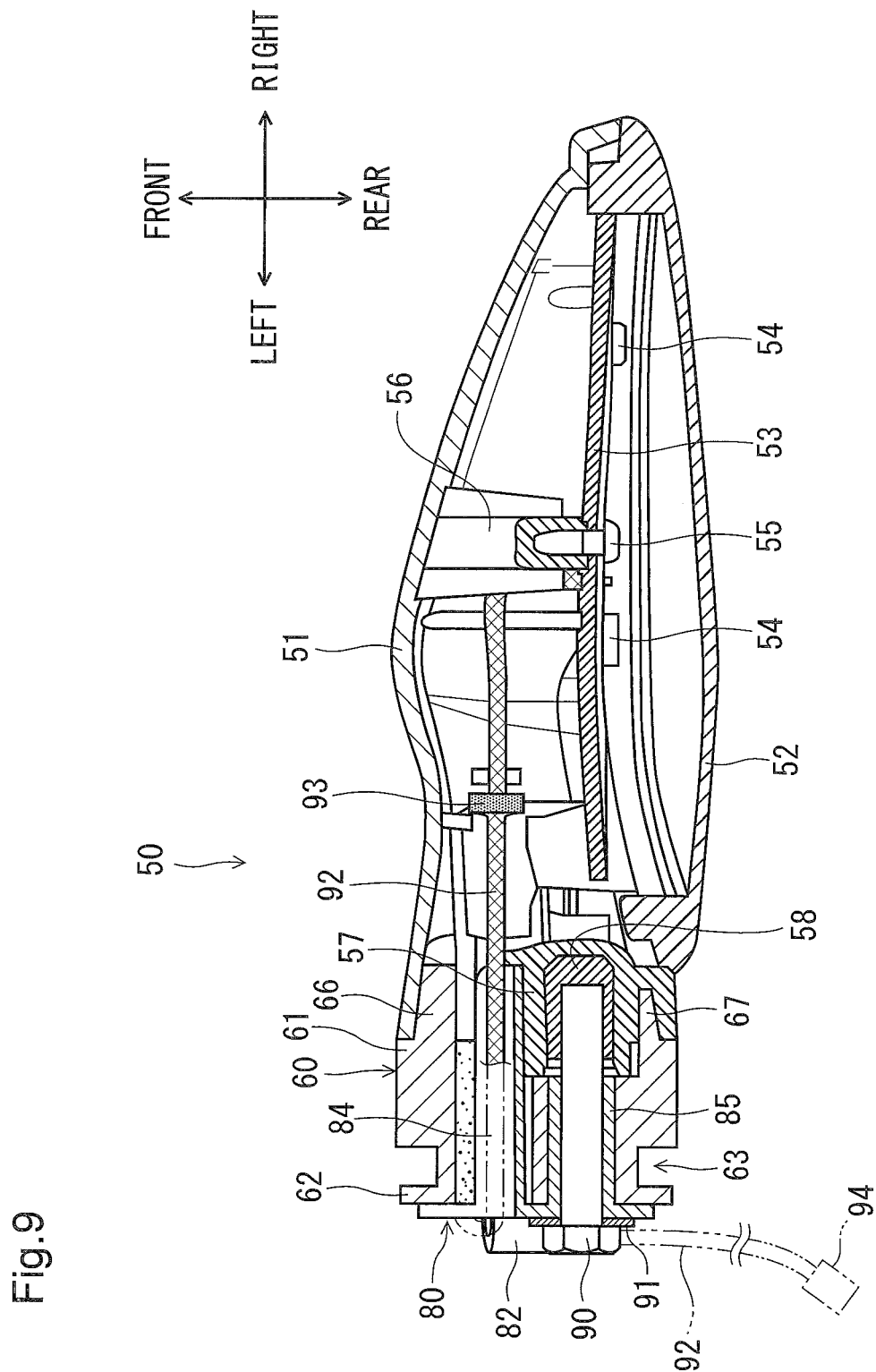
FIG. 9 is a sectional view taken along a line IX-IX in FIG. 3.

FIG. 9 is a sectional view taken along a line IX-IX in FIG. 3. The wirings 92 are just positioned by a grommet 93 made of rubber or the like on the blinker housing 51 side, however, in the present embodiment, the wirings 92 can be guided in the vehicle body front-rear direction by the wiring guide portion 82 having a curved-plate shape provided integrally with the fixing member 80, therefore, the wirings 92 can be prevented from projecting in the vehicle width direction without separately providing a component for guiding wiring.

The substrate 53 on which two light sources 54 are mounted is fixed to a standing portion 56 formed on the blinker housing 51 by a screw 55, and the wirings 92 are connected to the back surface side of the substrate 53. The wiring guide portion 82 also has a function to, even when the wirings 92 are externally pulled when mounting or removing the blinker device 50, etc., receive this pulling force and prevent it from influencing the portion connected to the substrate 53.

The boss 57 of the blinker housing 51 projects from an end portion of an outer shell member of the blinker housing 51 to the elastic member 60 side, and when the fastening member 90 is fastened via the fixing member 80, the collar member 85 of the fixing member 80 comes into contact with an end face of the boss 57, and the three components are fixed to each other without space between them.

The halved cylindrical portion 84 of the fixing member 80 is inserted in the blinker housing 51 side to a depth equivalent to the depths of the tip end portion of the screwed fastening member 90 and the engagement projection 66 of the elastic member 60. Accordingly, the distance of guiding the wirings 92 by a metal plate becomes longer, and smooth routing is possible.

Figure 10:
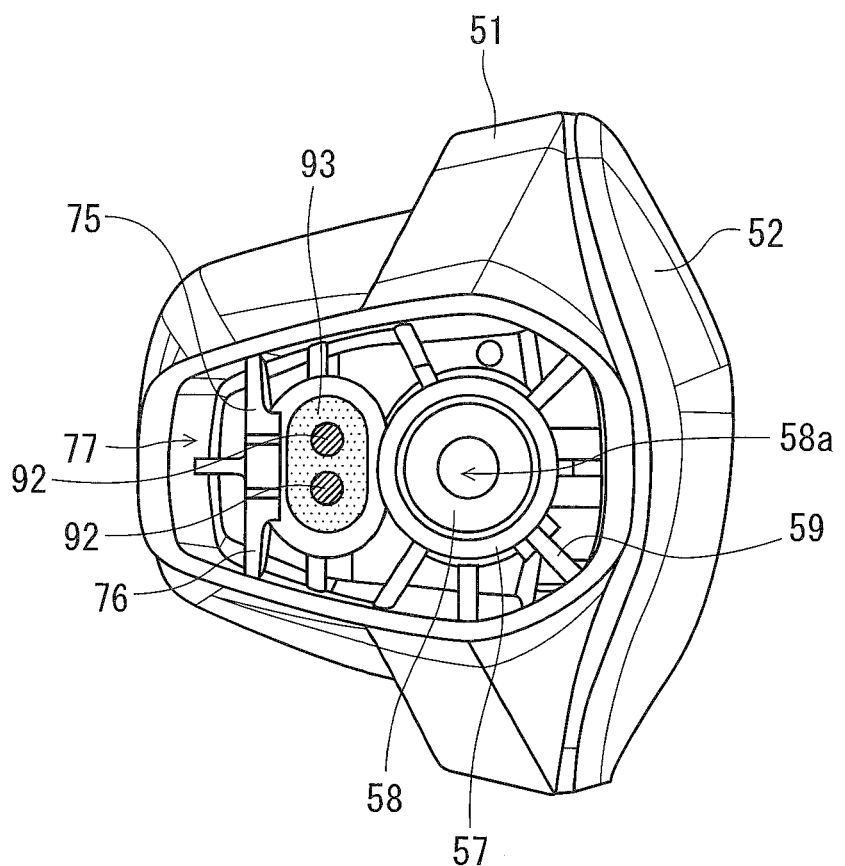
FIG. 10 is a left side view of the blinker device in a state where the elastic member is removed.
Figure 11:
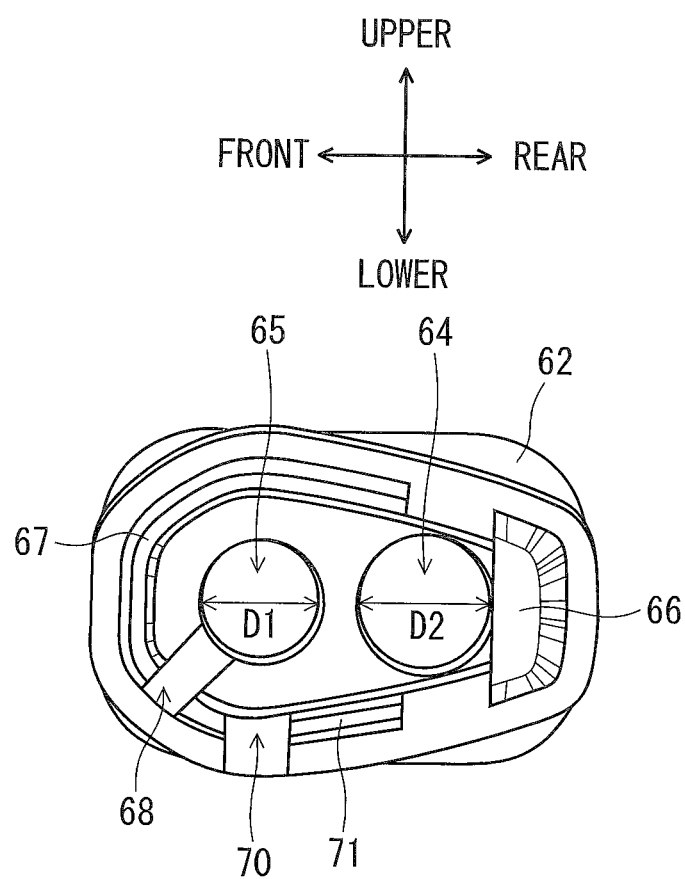
FIG. 11 is a front view of the elastic member.

FIG. 10 is a left side view of the blinker device 50 in a state where the elastic member 60 is removed. FIG. 11 is a front view of the elastic member 60 viewed from the blinker housing 51 side. The opening portion of the blinker housing 51 is formed such that the vertical dimension becomes gradually smaller from the lens 52 side toward the housing back surface side. The grommet 93 of the wirings 92 has a shape whose dimension in the front-rear direction is reduced by arranging the two wirings 92 vertically, and accordingly, the through hole 64 for wiring and the through hole 65 for a fastening member of the elastic member 60 can be made closer to each other.

As a positioning structure between the blinker housing 51 and the elastic member 60, both of a portion projecting from the blinker housing 51 side similar to the positioning projection 59 and a portion projecting from the elastic member 60 side similar to the engagement projection 66 are applied, and by providing these portions respectively projecting to each other from the blinker housing and the elastic member, reliable positioning is enabled.

In the present embodiment, since setting is performed so that the halved cylindrical portion 84 does not pass through the through hole 65 for a fastening member by making the diameter D2 of the through hole 64 for wiring larger than the diameter D1 of the through hole 65 for a fastening member of the elastic member 60, erroneous fitting hardly occurs as well when the fixing member 80 is fitted to the elastic member 60.

The structure of the blinker device and the shapes and materials of the fixing portion on the side of a vehicle body, the blinker housing, the elastic member, and the fixing member, and the shapes, etc., of the boss of the blinker housing, the positioning projection of the elastic member, the halved cylindrical portion of the fixing member and the collar member, are not limited to those of the above-described embodiment, and can be variously changed. For example, it is also possible to arrange the hole through which the wirings are inserted and the hole through which the fastening member is inserted in the vehicle body vertical direction. The blinker device according to the present invention is applicable to various vehicles such as a saddle-type three-wheeled vehicle/four-wheeled vehicle as well as a motorcycle.

REFERENCE SIGNS LIST

1 . . . motorcycle,
24 . . . rear fender (exterior component),
24a . . . fixing portion,
50 blinker device,
51 . . . blinker housing,
52 . . . lens,
53 . . . substrate,
54 . . . light source,
57 . . . boss,
59 . . . positioning projection,
60 . . . elastic member,
61 . . . main body portion, 64 . . . through hole for wiring,
65 . . . through hole for fastening member,
68 . . . fastening hole portion,
80 . . . fixing member,
81 . . . main body portion,
82 . . . wiring guide portion,
83 . . . wiring hole portion,
83a . . . cut-away,
84 . . . halved cylindrical portion,
85 . . . collar member,
86 . . . fastening hole portion,
90 . . . fastening member,
92 . . . wirings

The invention claimed is:

1. A blinker device in which a blinker housing internally equipped with a light source is elastically supported on a fixing portion on the side of a vehicle body via an elastic member, wherein
the elastic member is configured to be capable of being fitted to and removed from the fixing portion by elastically deforming a part of the elastic member,
the blinker device comprises:
a fixing member that is fixed to the elastic member; and
a fastening member that fixes the blinker housing, the elastic member, and the fixing member integrally,
in the fixing member, a fastening hole portion through which the fastening member is inserted, and a wiring hole portion through which a wiring to supply electricity to the light source is inserted, are disposed side by side to each other,
the wiring hole portion is provided with a cut-away that opens a part of the wiring hole portion,
the fixing member is provided with a halved cylindrical portion that is stood from a rim of the wiring hole portion and passes through a through hole for wiring provided in the elastic member, and
the fixing member is provided with a tubular collar member that passes through a through hole for a fastening member provided in the elastic member so as to be stood from a rim of the fastening hole portion and parallel to the halved cylindrical portion.

2. The blinker device according to claim 1, wherein
in the blinker housing, a cylindrical boss in which the fastening member is screwed is formed, and
the cylindrical boss is provided with a positioning projection that engages in a positioning groove formed in the elastic member.

3. The blinker device according to claim 1, wherein the fixing member is provided with a wiring guide portion to guide the wiring that projects to the inside of a vehicle body after the blinker device is assembled.

4. The blinker device according to claim 2, wherein
the fixing member is provided with a tubular collar member that passes through a through hole for a fastening member provided in the elastic member, and
the collar member is configured to be brought into contact with the boss provided in the blinker housing by fastening the fastening member.

5. The blinker device according to claim 2, wherein the through hole for wiring and the through hole for a fastening member are made different in size from each other.

6. The blinker device according to claim 2, wherein the through hole for wiring and the through hole for a fastening member are provided side by side in the vehicle body front-rear direction.

7. The blinker device according to claim 1, wherein the fixing member is provided with a wiring guide portion to guide the wiring that projects to the inside of a vehicle body after the blinker device is assembled.

* * * * *